United States Patent
Iwami et al.

(10) Patent No.: US 7,373,770 B2
(45) Date of Patent: May 20, 2008

(54) SKATE UNIT FOR CABLE PROTECTION AND GUIDE DEVICE

(75) Inventors: Tsutomu Iwami, Osaka (JP); Masaaki Ikeda, Osaka (JP); Fujio Yamamoto, Osaka (JP); Tsuyoshi Ishizuka, Saitama (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/707,541

(22) Filed: Feb. 16, 2007

(65) Prior Publication Data

US 2007/0227117 A1 Oct. 4, 2007

(30) Foreign Application Priority Data

Mar. 29, 2006 (JP) .............................. 2006-090875

(51) Int. Cl.
*F16G 13/16* (2006.01)
*H02G 11/00* (2006.01)

(52) U.S. Cl. ............................. 59/78.1; 248/49; 248/51
(58) Field of Classification Search ................ 59/78.1; 248/49, 51
See application file for complete search history.

(56) References Cited

U.S. PATENT DOCUMENTS

| | | | | |
|---|---|---|---|---|
| 3,446,159 A | * | 5/1969 | Lawson | 104/178 |
| 3,994,373 A | * | 11/1976 | Loos et al. | 191/12 C |
| 4,462,565 A | * | 7/1984 | Johnson | 248/51 |
| 4,789,120 A | * | 12/1988 | Spidel | 248/49 |
| 5,178,247 A | * | 1/1993 | Vagaggini | 191/12 C |
| 5,649,415 A | * | 7/1997 | Pea | 59/78.1 |
| 2005/0155337 A1 | | 7/2005 | Worms | |

FOREIGN PATENT DOCUMENTS

| | | | |
|---|---|---|---|
| EP | 1193420 | * | 10/2001 |
| JP | 57-016273 | | 1/1982 |
| JP | 10-220533 | * | 8/1998 |
| JP | 2005-515370 | | 5/2005 |

* cited by examiner

*Primary Examiner*—David B Jones
(74) *Attorney, Agent, or Firm*—Howson & Howson LLP

(57) ABSTRACT

A skate disposed between facing portions of a folded, flexible, cable guide includes a first set of rollers which contact only one of the two facing portions, and a second set of rollers which contact only the other of the two facing portions. A turning member mounted at an end of the skate is in rolling contact with the bent portion of the guide.

15 Claims, 11 Drawing Sheets

II—II

III—III

IV—IV

SKATE UNIT FOR CABLE PROTECTION AND GUIDE DEVICE

CROSS-REFERENCE TO RELATED APPLICATION

This application claims priority on the basis of Japanese patent application 2006-090875, filed Mar. 29, 2006. The disclosure of Japanese application 2006-090875 is hereby incorporated by reference.

FIELD OF THE INVENTION

The invention relates generally to cable protection and guide devices, hereinafter referred to for brevity as "cable guides," for protecting and guiding flexible cables. More specifically, the invention relates to an improved skate unit, or a skate composed of one or more such units, for interposition between two facing parts of a folded cable guide in order to promote smooth flexing movement of the cable guide, and to prevent damage resulting from frictional contact or collision between the parts, and thereby extending the useful life of the cable guide.

BACKGROUND OF THE INVENTION

The term "flexible cable," as used herein, means any flexible, elongated, energy or fluid-conducting device, such as a cable composed of one or more electrical wires or optical fibers, a fluid-conducting hose for conducting compressed air or a hydraulic fluid used as a medium for transmission of motive power, a flexible conduit used to convey a gas, a liquid, or another fluid material for use in a machine or industrial process, a flexible actuator such as a Bowden wire, or a flexible rotating shaft with or without a non-rotating sheath. Such flexible cables are used, for example, to connect relatively moving parts of a machine such as a machine tool, an industrial robot, or a conveyor or other material-handling or material-carrying machine, such as a hoist or other machine used in a civil engineering application.

When a flexible cable is connected to a moving part, torsion, flexion, and tensile forces applied to the cable as a result of movement of the moving part can result in damage to, or distortion of, the cable. Cable guides have been used to avoid damage and distortion of the cables.

As shown in FIG. 10, a typical cable guide 100 is composed of a number of links, each comprising a pair of side plates 102 disposed on both sides of a cable C, and connecting rods or plates 101 connecting the side plates. The connecting plates 101 form bridges connecting the side plates of the cable guide both above and below the cable, and, together with the side plates 102, form an elongated channel through which the cable C extends. The side plates 102 on each side of the guide are hinged to one another so that the guide can bend at least in a single plane. Usually, the flexion of the guide is limited to a specific minimum radius of curvature in order to avoid kinking of the cable C.

Typically, the cable guide has a fixed end 105 and a moving end 106. Where a cable guide of sufficient length is folded on itself by a bend 120 as shown in FIG. 5, it is possible for two portions of the guide to come into face-to-face contact with each other. Friction between the contacting parts of the guide can obstruct smooth reciprocating motion. Moreover, frictional contact over time can cause wear and eventual breakage of the cable guide. Breakage can also result from interference between projecting portions of the two facing parts of the guide.

To avoid the problems resulting from frictional contact between facing parts of a folded cable guide, a skate can be interposed between the facing parts. As illustrated in FIG. 7, a skate 300 is sandwiched between two facing parts of the cable guide, preventing direct contact between the facing parts. A typical conventional skate is depicted and described in United States Patent Application Publication 2005/0155337, dated Jul. 21, 2005.

Alternatively, a plurality of supporting rolls can be provided on upper and lower parts of a frame disposed between facing portions of a folded cable guide, as shown in Japanese Patent Publication No. Sho. 57-16273. In this case, the rollers on the upper and lower parts of the frame are disposed at equal intervals, and each roller on the upper part of the frame has a corresponding roller directly below it on the lower part of the frame.

The skate 300 of FIG. 7 includes pairs of rollers disposed between upper and lower parts of the cable guide. As shown in FIG. 8, the skate includes a pair of side frames 33 in which the rollers are rotatable, and a base 340, which maintains a predetermined widthwise distance between the side frames 330.

A skate 300 of the kind illustrated in FIG. 7 can be used with a long cable guide 100, where the opposed parts of the cable guide face each other over a long distance, even as much as several tens of meters. Since the cable guide 100 comprises interconnected, molded, links, accumulation of slight differences between the pitches of the right and left portions of the links can lead to lateral flexion in the guide 100, as illustrated in FIG. 9. Excessive lateral flexion of the guide from the ideal position, represented by the two parallel broken lines, can cause the guide 100 to come off from the skate 300.

When the cable C accommodated within the cable guide 100 is out of balance in the widthwise direction, the cable guide can snake. Furthermore, with a long skate, it is difficult to establish parallelism between a guide rail on which the fixed end 105 of the cable guide 100 is mounted, and a movable machine, or portion of a machine, attached to the movable end 106 of the guide. Thus, the guide 100 can move in a slanted relationship to the rollers 320, generating a force that acts laterally on the rollers 320. As a result, slip is generated between the rollers 320 and the cable guide 100. The slip prevents the skate 300 from moving smoothly, and generates a longitudinal shift of the skate relative to the cable guide. When the longitudinal shifts of the skate accumulate due to repeated reciprocation of the movable part of the guide, the guide can eventually collide with the skate. In the worst case, the skate 300, or the cable guide 100, can become deformed or damaged.

The rollers 320 of the skate 300 are sandwiched between upper and lower parts of a cable guide or between independent upper and lower cable guides. When the skate is to be removed from maintenance, it is typically taken out in the direction indicated by the arrow F in the enlarged part of FIG. 7. A large amount of sliding resistance is generated at contact points X and Y, between the rollers 320 and the upper and lower parts of the guide. Therefore, a large force is needed to draw the skate 300 out from between the upper and lower parts of the guide. The large drawing force required for removal of the skate can be reduced by lifting the upper part of the guide so that the skate can roll easily on the lower part of the guide. However, because of the difficulty encountered in lifting the upper part of a guide, raising the upper part of the guide does not make it significantly easier to remove the skate for maintenance.

In the skate described in Japanese Patent Publication No. Sho. 57-16273, where independent rollers are provided on upper and lower parts of a skate frame, removal of the skate from between opposed parts of a cable guide is easier than in the case of the skate of U.S. Patent Application Publication 2005/0155337. However, the skate described in the Japanese patent publication requires a large vertical space between the opposed parts of the cable guide.

An object of this invention is to provide a compact skate for a cable guide, which increases the useful life and endurance of the cable guide, and which can be removed readily and easily for maintenance.

SUMMARY OF THE INVENTION

A cable guide assembly according to the invention comprises a flexible cable, a cable guide, and a skate. The cable guide is made up of a series of articulably interconnected links, each link comprising pair of side plates bridged by a pair of spaced connectors. The side plates and spaced connectors form a protective channel through which the cable extends.

The guide has a fixed end and a movable end, and is folded on itself at a bend, so that a first portion of the guide is in opposed relationship to a second portion of the guide, but the opposed portions are movable longitudinally relative to each other. The guide also has a radius of flexion limited to a predetermined minimum radius.

A skate is disposed between the first and second portions of the guide to prevent contact between those portions of the guide. The skate comprises an elongated frame having first and second sets of rollers, the rollers of the first set being in rolling contact with only one of the opposed portions of the guide and the rollers of the second set being in rolling contact with only the other of the opposed portions of the guide. The skate also comprises a turning member disposed at an end of the elongated frame and carried with the elongated frame. The turning member has a guide support in contact at least with plural, circumferentially spaced, portions of the guide along a circumferential side of the guide at the bend.

In first and second embodiments of the invention, the guide support comprises a plurality of circumferentially spaced rollers in rolling contact with plural, circumferentially spaced, portions of the guide along the inner or outer circumferential side of the guide at the bend. In another embodiment of the invention, the turning member comprises a circular drum in contact with plural portions of the guide along the inner circumferential side of the guide at the bend.

The cable guide has a longitudinal axis disposed substantially in a first plane, in which the skate is movable along a substantially straight longitudinal direction, and the guide support is preferably in contact with portions of the guide on both sides of an imaginary second plane perpendicular to the first plane, parallel to the longitudinal direction in which the skate is movable, and intersecting a center of the turning member about which the plural, circumferentially spaced, portions of the guide are centered.

Preferably, the rollers of the first and second sets are flanged rollers.

It is also preferred that the first and second portions of the guide be spaced from each other by a distance less than the sum of the diameter of a roller of the first set and the diameter of a roller of the second set, and that the rollers of the first and second sets be longitudinally offset, and overlap one another in a direction normal to the longitudinal directions of the first and second portions of the guide.

Since the opposed portions of the cable guide are in rolling contact with different sets of rollers, there is no sliding friction between the rollers and the cable guide, and consequently the force required to move the cable guide is reduced, the skate can move smoothly without being damaged, and the durability and useful service life of the cable guide are increased.

Furthermore, when the skate is drawn out from between the opposed portions of the cable guide, no sliding resistance is generated between the skate and cable guide device. Thus, the skate can be drawn out easily for maintenance.

In addition, because the rollers of the first and second sets are flanged rollers, lateral forces will not cause the guide to swing, and the guide can reciprocate smoothly without coming off the skate.

Finally, the offset, overlapping, relationship of the rollers provides for a more compact cable guide assembly.

BRIEF DESCRIPTION OF THE DRAWINGS

FIG. 2 is a cross-sectional view taken on section plane II-II of FIG. 1a.

FIG. 3 is a cross-sectional view taken on section plane III-III of FIG. 1a;

FIG. 4 is a cross-sectional view taken along section plane IV-IV of FIG. 1a;

FIG. 5b is a side elevational view of the skate of FIG. 5a;

DETAILED DESCRIPTION OF THE PREFERRED EMBODIMENTS

Figure 1A:
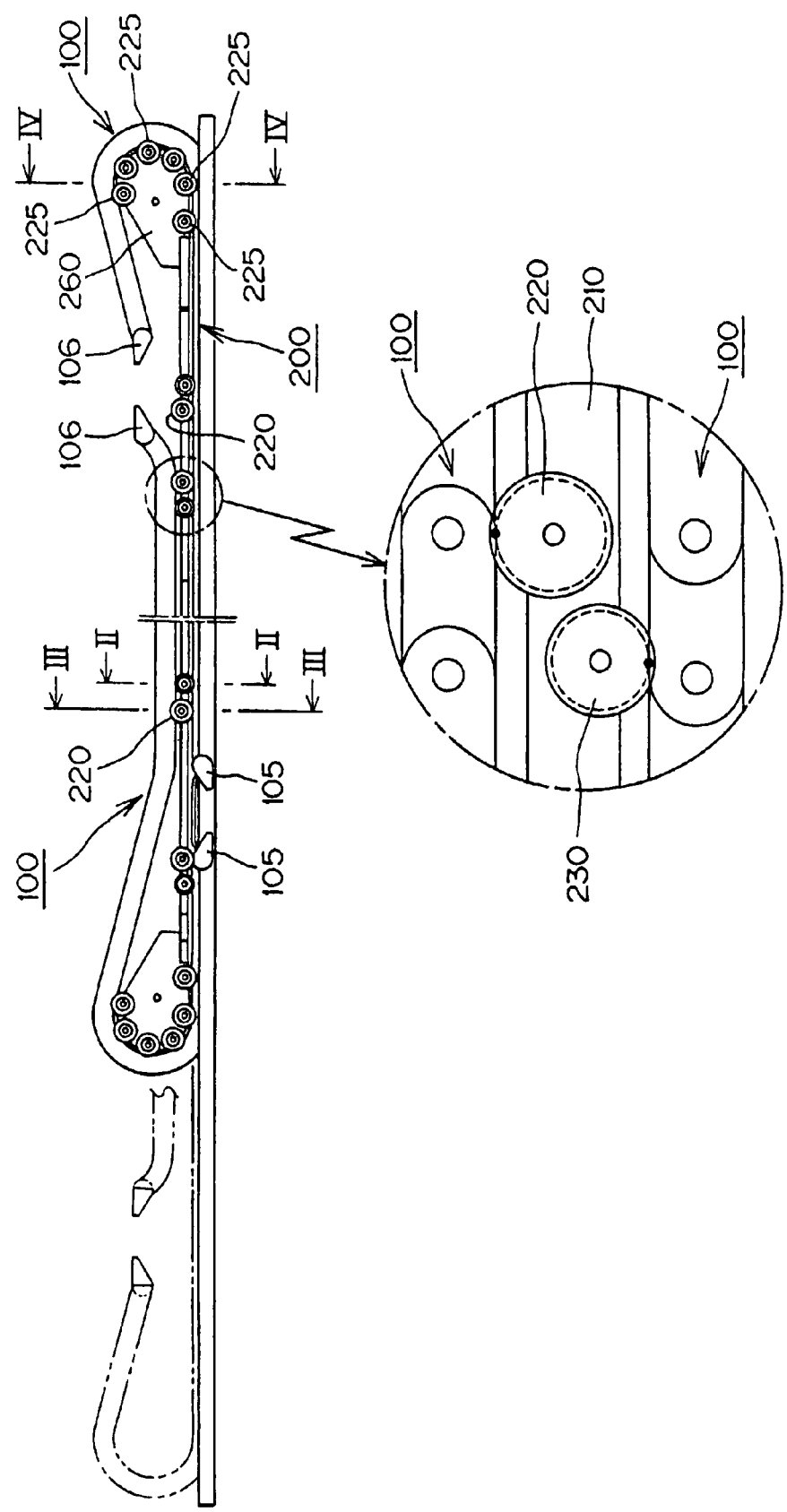
FIG. 1a is a schematic side elevational view of a cable guide assembly incorporating showing a skate according to a first embodiment of the invention, and also showing an enlargement of a portion of the skate to illustrate offset, overlapping, rollers.
Figure 10:
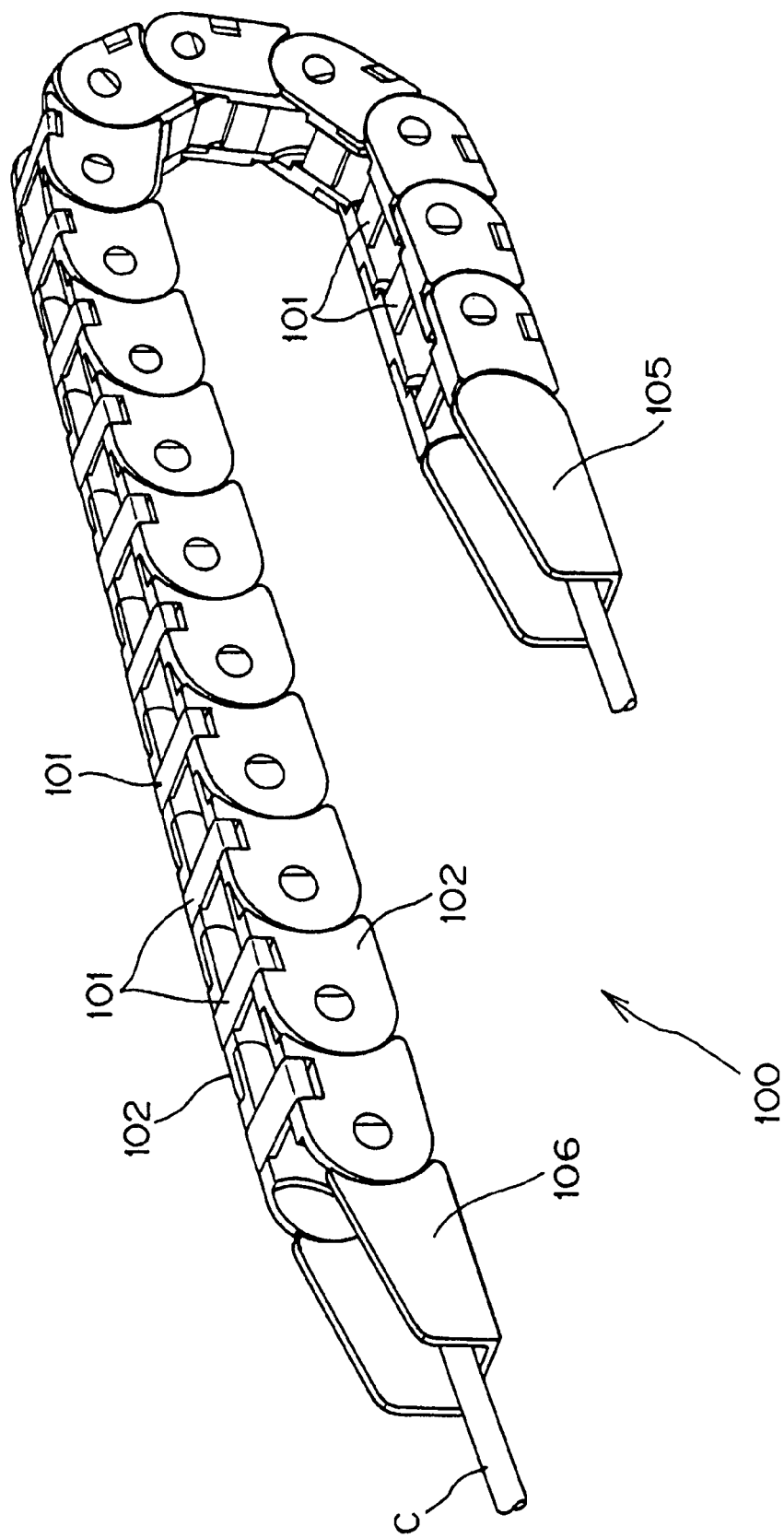
FIG. 10 is a perspective view showing a conventional cable guide.

In FIG. 1a, the cable guide itself is conventional and its parts are designated by the same reference numerals as are used in FIG. 10. In FIG. 1a, two cable guides 100 are folded so that their respective fixed ends 105 are opposed to each other, as are their respective movable ends 106. Each of the movable ends 106 moves along a horizontal line.

Figure 2:
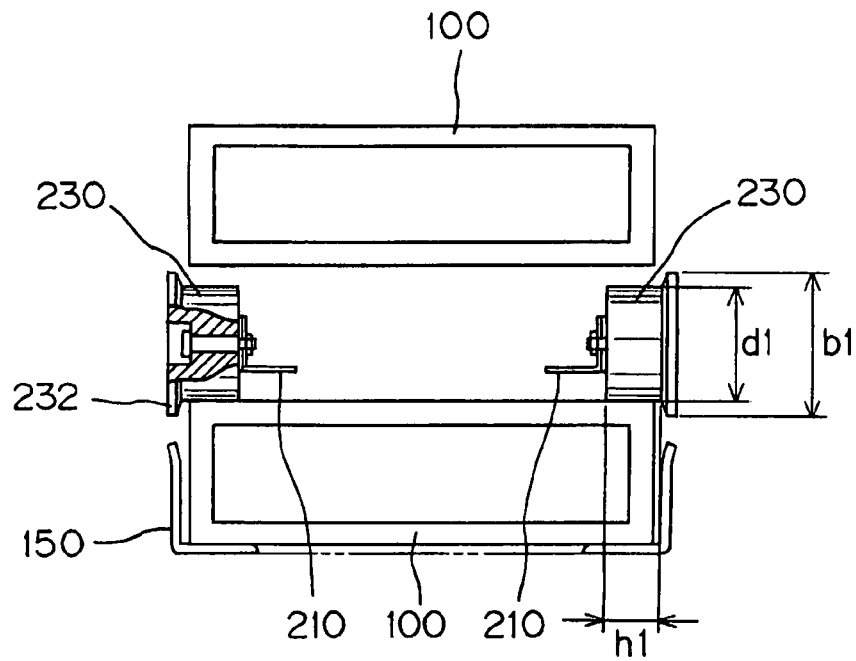
Figure 4:
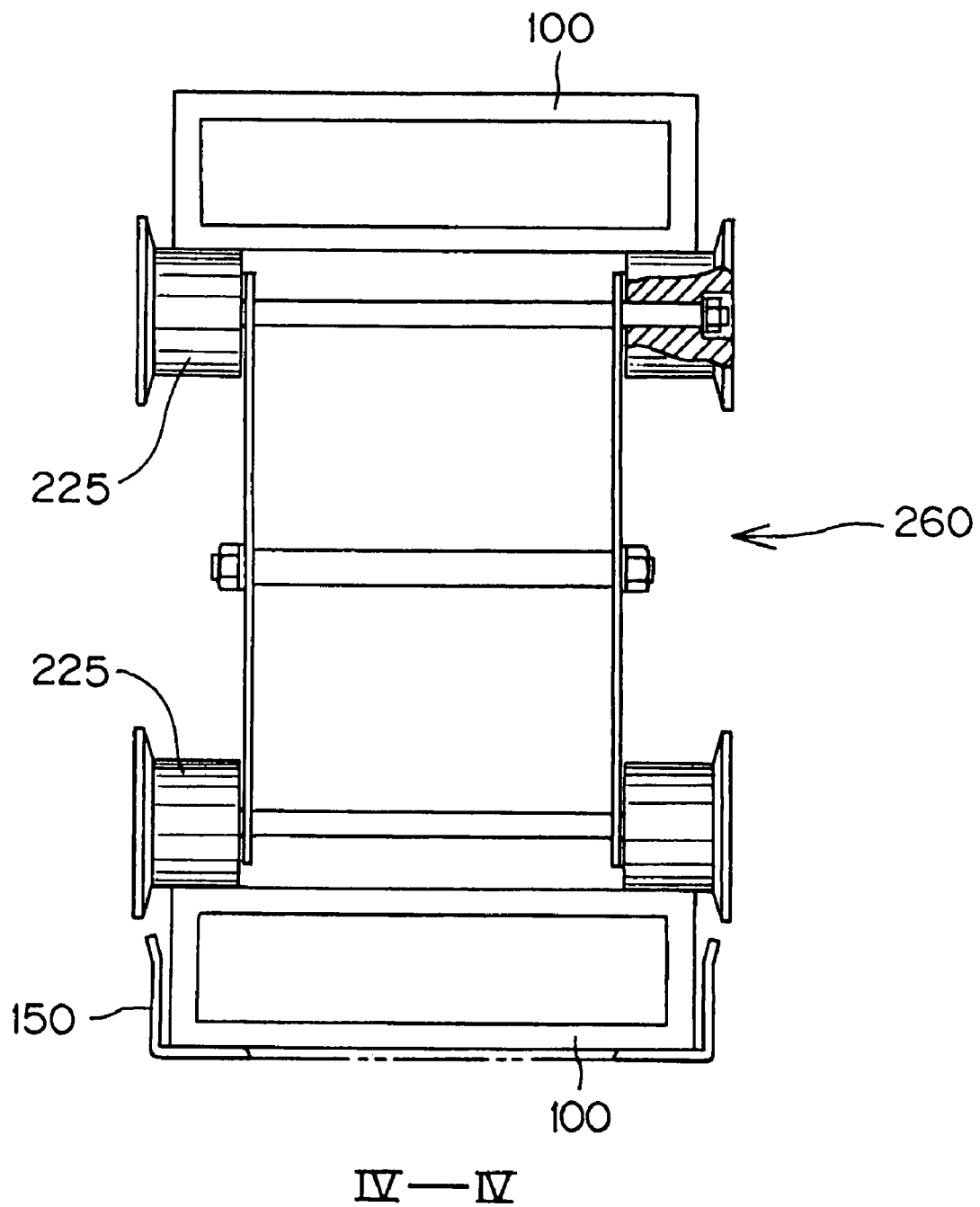
Figure 5A:
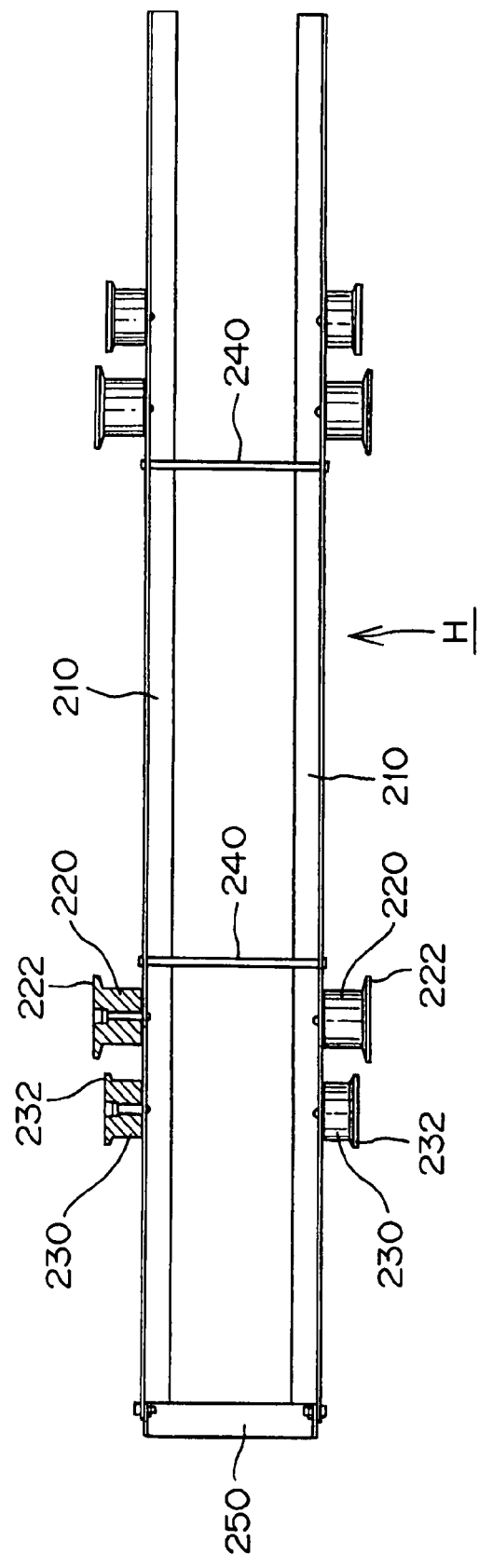
FIG. 5a is a top plan view of a skate according to the invention.
Figure 5B:
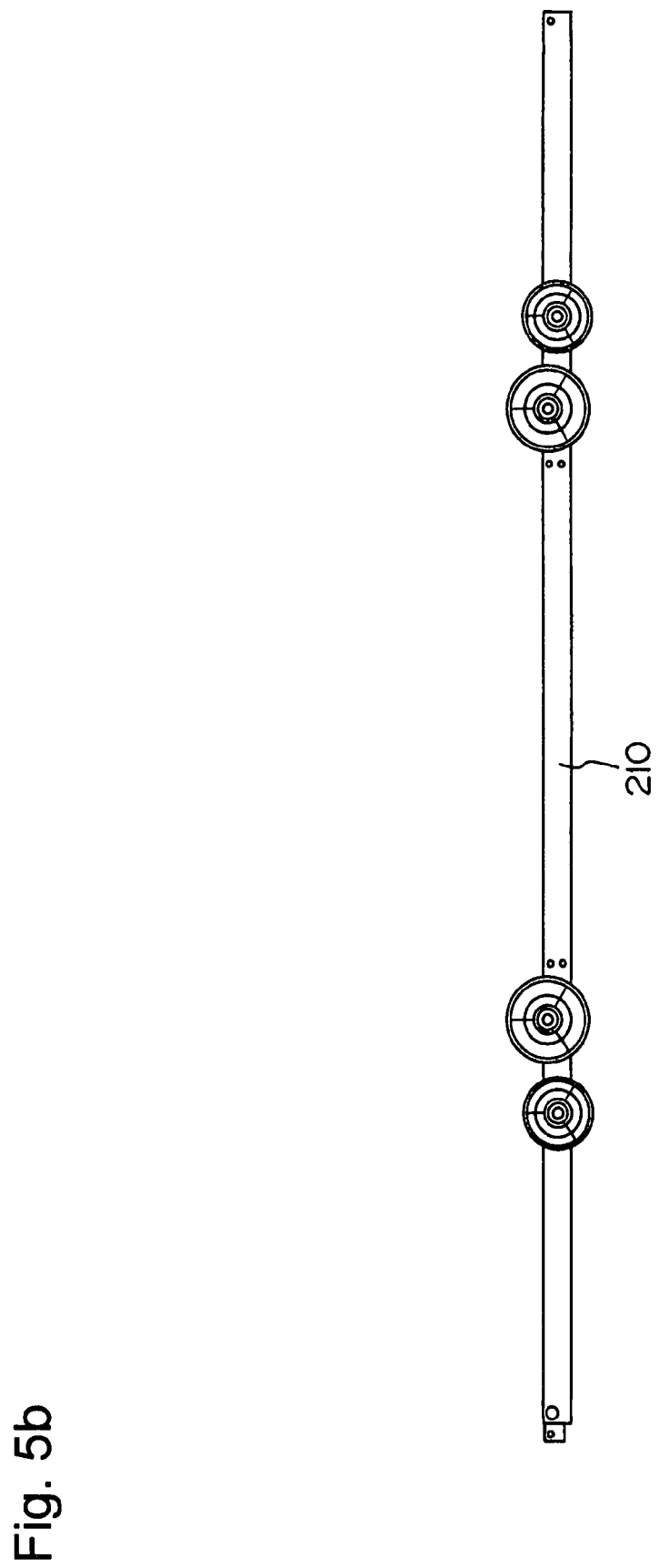

In the cross-sectional view in FIG. 2, two lower rollers 230 are shown in rolling contact with the lower portion of two opposed portions of the cable guide 100, which are shown schematically. In the cross-sectional view in FIG. 3, two upper rollers 220 are shown in rolling contact with the upper portion of the cable guide. FIG. 4 shows the turning member 260, which includes a set of rollers 225, which are all in contact with an inner circumferential surface of the guide at the bend where the guide is folded on itself. The skate 200 can be made up of plural units, one of which is shown in FIGS. 5a and 5b. In the enlargement which forms a part of FIG. 1a, it can be seen that the upper guide roller 220 comes into contact with the upper portion of the cable guide 100 and not with the lower portion while the lower guide roller 230 comes into contact with the lower portion of the cable guide but not with the upper portion. The rollers are rotatably mounted an L-shaped angle member 210, and are in a staggered arrangement, that is, the upper rollers are longitudinally offset from the lower rollers, and overlap each other in the direction normal to the two opposed parts of the cable guide. The arrangement of the rollers allows the upper and lower parts of the cable guide to be spaced by a distance greater than the diameter of the largest roller, but less than the sum of the diameters of the two rollers. Therefore, the upper and lower parts of the cable guide can approach each other closely for improved compactness and stability.

As shown in FIG. 5a, the horizontal member H comprises two elongated, L-shaped, angle members 210 opposed to each other in parallel, spaced relationship by connecting bars 240. A connecting plate 250 also extends between the two angle members at one end of member H for connecting member H to anther, similar member. Thus, a long skate can be made up of a connected series of shorter members such as member H.

The length of one horizontal member H is typically 2 meters. Yet, by connecting several horizontal members, the skate can be made in any desired length, and the skate can be, for example several tens of meters long., if required. Construction of a horizontal member H from a series of shorter (e.g., two meter long) units makes it possible to remove and replace shorter units individually, and thus facilitates repair and maintenance of the skate. The length of the horizontal member, of course, can be any desired length, and the length can be chosen in accordance with the application or applications in which the skate is to be used.

Member H is preferably made up of parallel, L-shaped, angle members, as shown. However, various alternative structures can be used. For example, the member H can be in the form of a U-shaped member or a rectangular member. Furthermore various materials can be used. For example, the bars 240, while desirably composed of aluminum, can be made from iron, synthetic resin, or any of a wide variety of other suitable materials.

Synthetic resin is preferred as a material for the rollers 220 and 230, and is preferably a resin having high wear resistance and dimensional stability.

Figure 3:
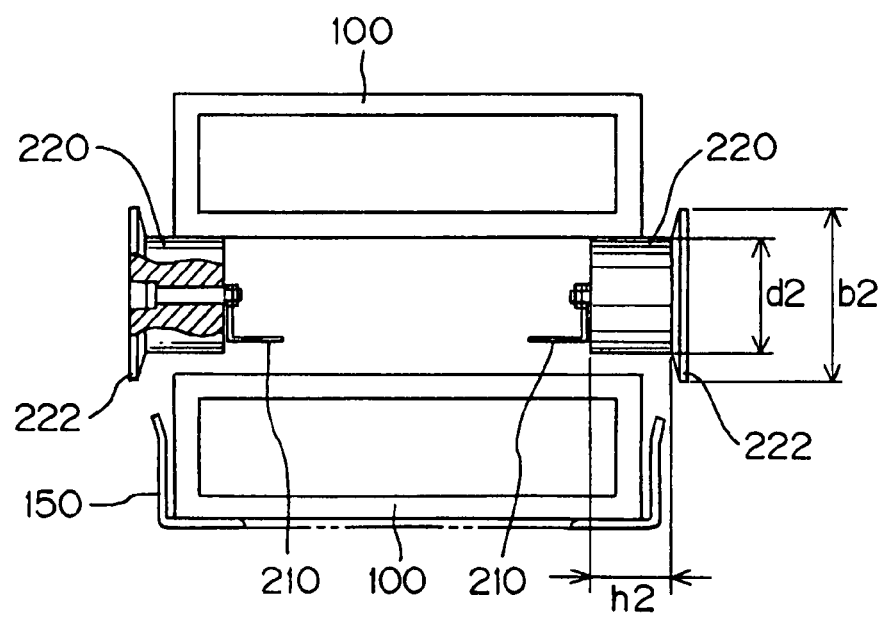

As shown in FIGS. 2 and 3, the upper guide rollers 220 and the lower guide rollers 230 have diameters d1 and d2 respectively, which are preferably, but not necessarily, the same. However, the rollers have flanges, and the diameters b2 of the flanges 222 of the upper rollers 220 are preferably greater than the diameters b1 of the flanges 232 of the lower rollers 230. The thickness h2 (i.e., the axial length) of the upper rollers 220 is also preferably greater than the thickness h1 of the lower rollers 230. The lower portion of the cable guide 100 is restricted so that it does not swing laterally. The inside face of the flange 232 of the upper guide roller 230 is set so that it is situated in close relationship to a side surface of the lower portion of the cable guide 100, as shown in FIG. 2. On the other hand, since the upper portion of the cable guide is likely to swing laterally, the greater thickness h2 of the upper guide rollers 220 provides gaps between the inside faces of the flanges 222 and sides of the upper portion of the cable guide to absorb the lateral swing of the upper portion of the guide. The greater diameter b2 of the flanges 222 on rollers 220, and the greater thickness h2 of the rollers 220 cooperate to prevent the upper portion of the cable guide from coming off the upper guide rollers 220.

FIG. 1a shows a skate in which a turning member 260 is disposed on the inside of the bend at which the cable guide is folded on itself. The turning member 260 is replaceably attached to an end of the frame of the skate. Plural, circumferentially spaced, rollers 225 are rotatably mounted on the turning member 260, and their shapes are preferably the same as the shape of the upper guide rollers 220. These rollers 225 engage an inside circumferential surface of the cable guide 100 at the location of the bend, and are in rolling contact with plural, circumferentially spaced, portions of the guide both above and below the height of the center of turning member 260 about which the rollers are circumferentially spaced. More generally, the rollers, which serve as a guide support, are in contact with plural, circumferentially spaced, portions of the guide on both sides of an imaginary second plane perpendicular to a first plane in which the longitudinal axis of the guide is disposed, parallel to the longitudinal direction in which the skate moves, and intersecting a center of the turning member about which the plural, circumferentially spaced portions of the guide are centered. The radius of the turning member, that is, the radius of the circle intersected by the axes of the rollers 225, preferably corresponds to the minimum radius of flexion of the guide.

Figure 1B:
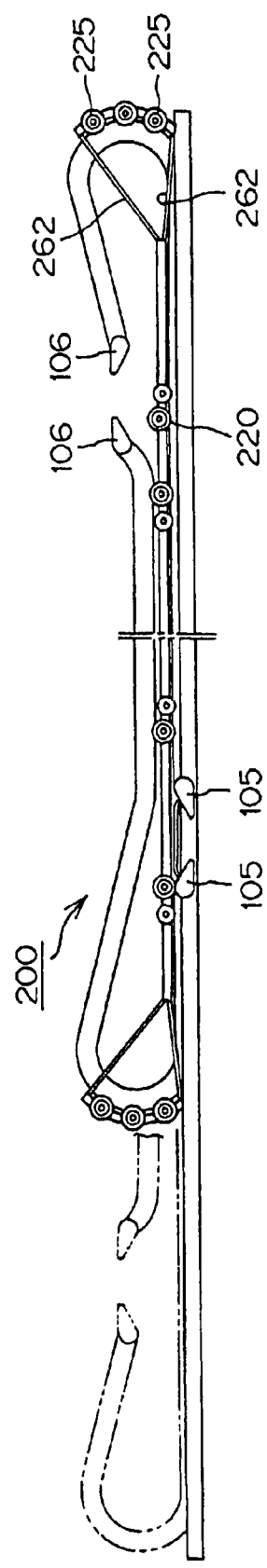
FIG. 1b is a schematic side elevational view of a cable guide assembly according to a second embodiment of the invention.

In the alternative embodiment illustrated in FIG. 1b, the rollers of the turning member are disposed on the outside of the bend of the cable guide. The turning member comprises an arc-shaped member on which rollers 225 are rotatably mounted, and straight braces 262, which connect the arc-shaped member to the horizontal frame of the skate. Here, as in FIG. 1a, the shape of the turning rollers 225 is preferably the same as the shape of the upper guide rollers 220. The skate 200 moves by rolling contact along the cable guide as the movable end 106 of the cable guide moves longitudinally, and suppresses lateral shifting of the upper portion of the cable guide relative to the lower portion. Although, in the embodiment shown in FIG. 1b, the rollers 225 are rotatable and mounted on an arc-shaped member supported by plural braces 262, various alternatives are possible. For example, the rollers can be mounted on a plate or a pair of laterally opposed plates, which are attached to the frame of the skate and extend past the bend and beyond the outside circumferential surface of the cable guide. Here, as in the embodiment of FIG. 1a, the rollers engage the bend of the guide both above and below the center of the turning member about which the rollers are circumferentially spaced. That is, the rollers, which serve as a guide support, are in contact with plural, circumferentially spaced, portions of the guide on both sides of an imaginary second plane perpendicular to a first plane in which the longitudinal axis of the guide is disposed, parallel to the longitudinal direction in which the skate moves, and intersecting a center of the turning member about which the plural, circumferentially spaced portions of the guide are centered. Here, as in the case of the embodiment of FIG. 1a, the radius of the turning member preferably corresponds to the minimum radius of flexion of the guide.

Figure 6:
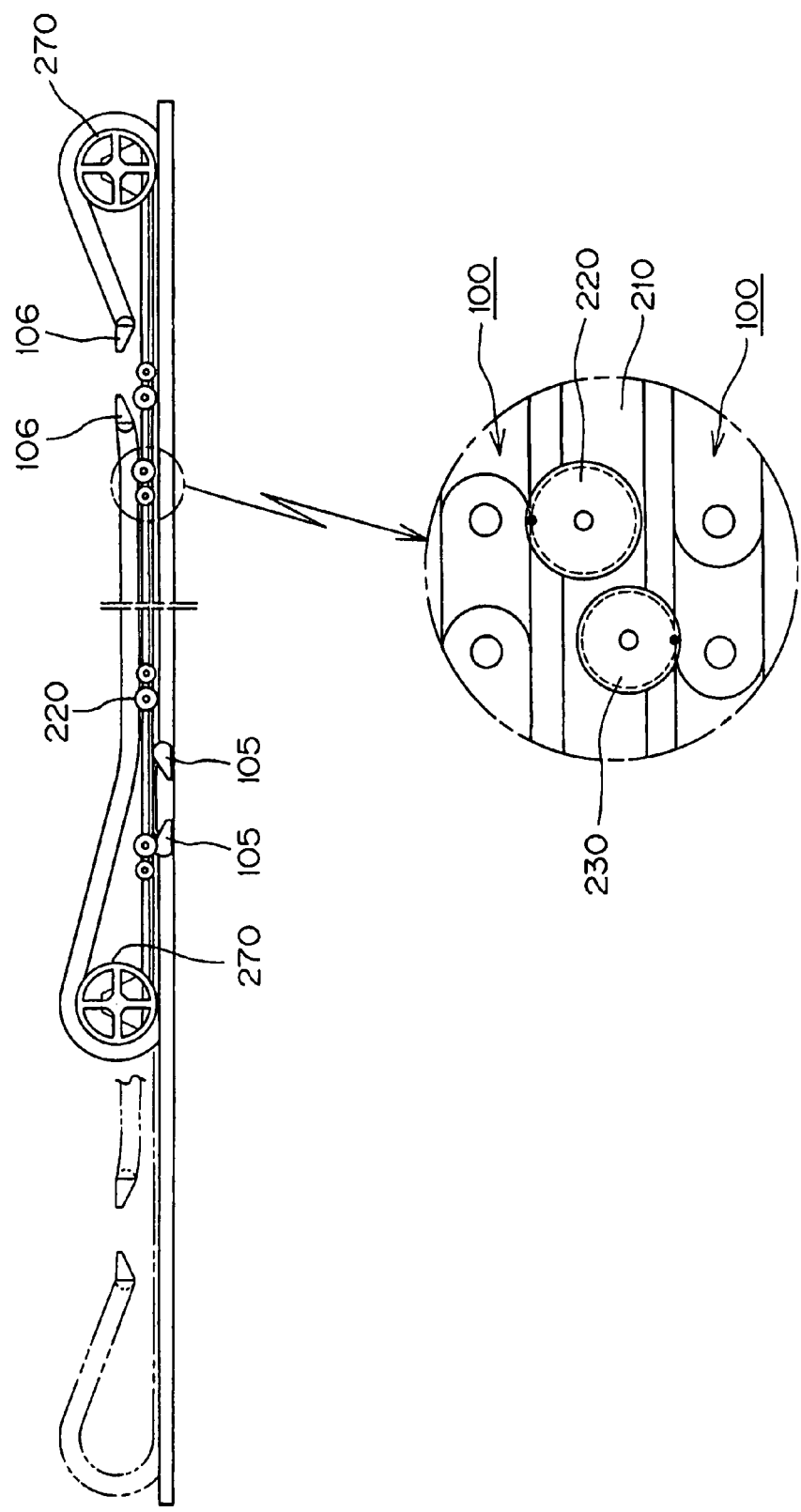
FIG. 6 is a schematic side elevational view of a cable guide assembly incorporating showing a skate according to a third embodiment of the invention, and also showing an enlargement of a portion of the skate to illustrate offset, overlapping, rollers.
Figure 7:
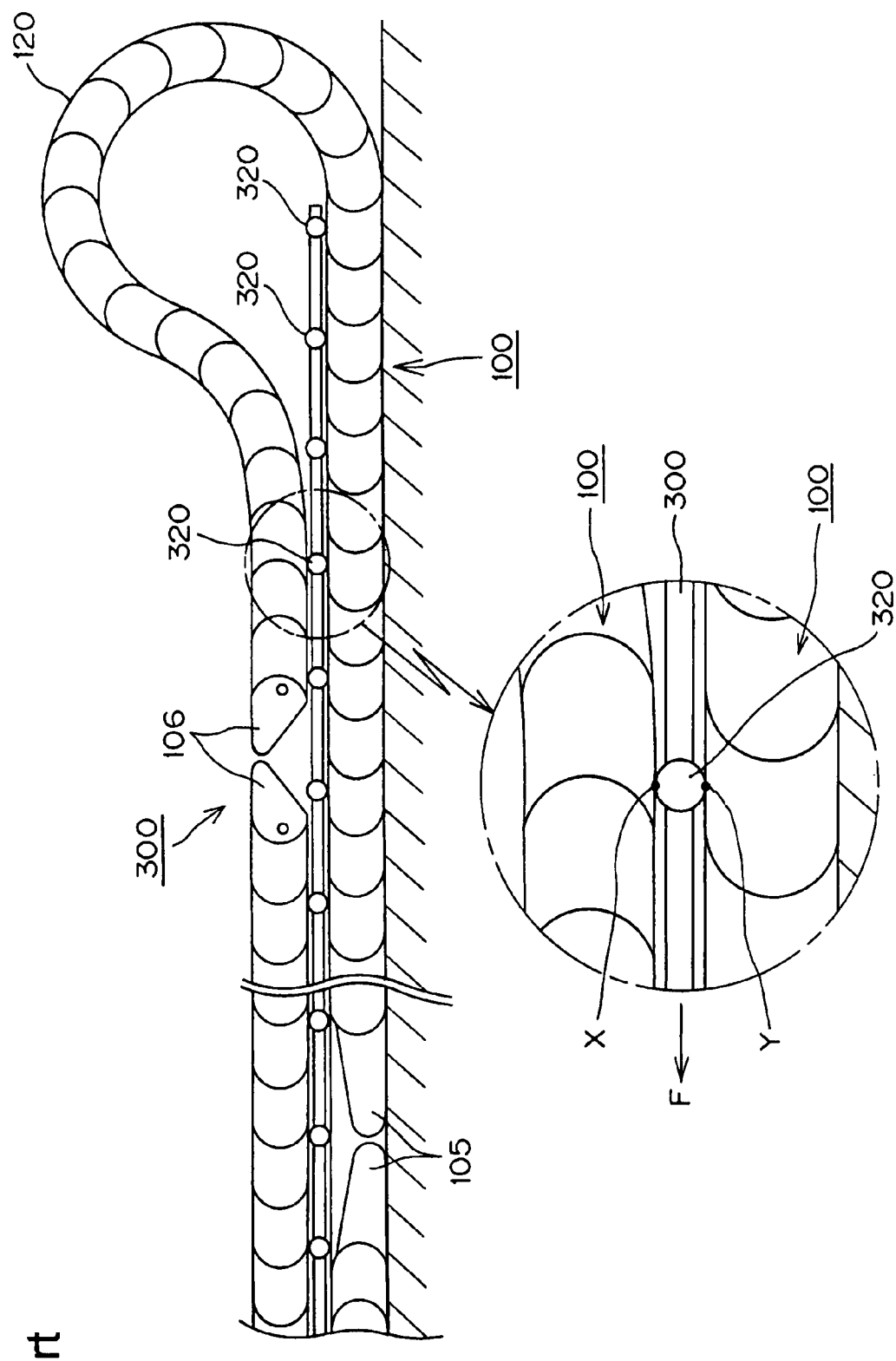
FIG. 7 is a side elevational view showing a cable guide incorporating a conventional skate, and also showing an enlargement of a roller on the skate.
Figure 8:
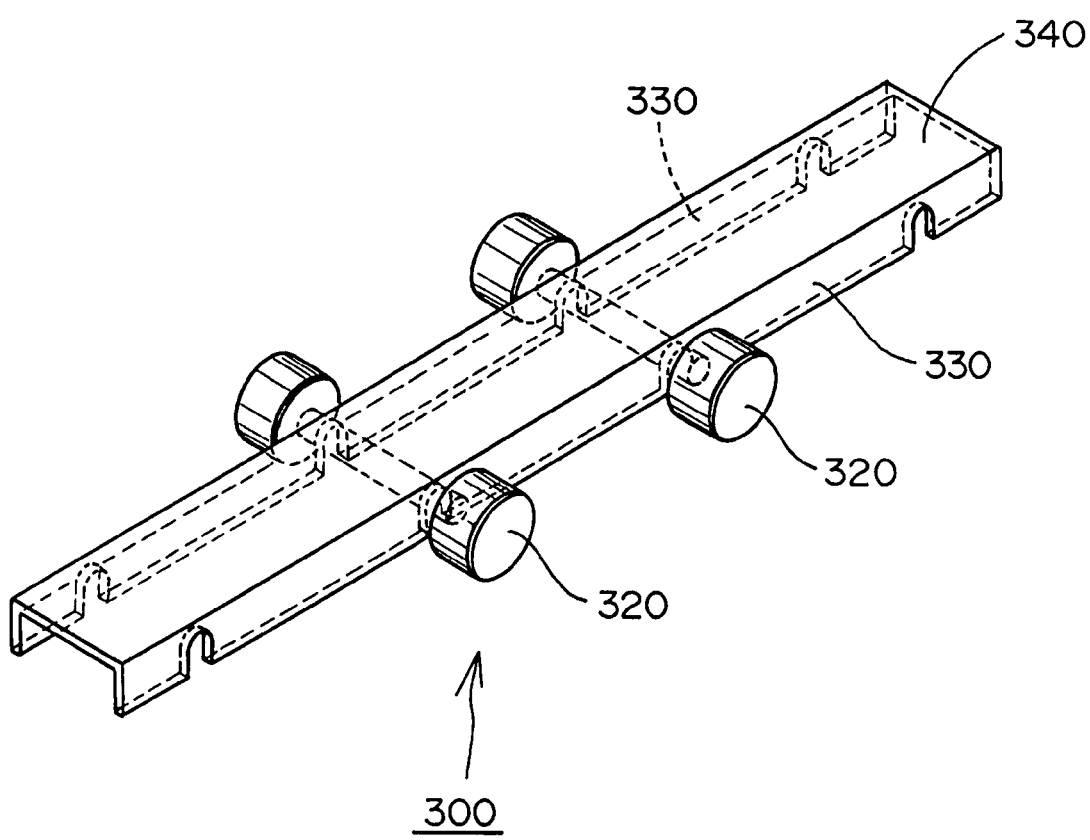
FIG. 8 is a perspective view of a portion of a conventional skate.
Figure 9:
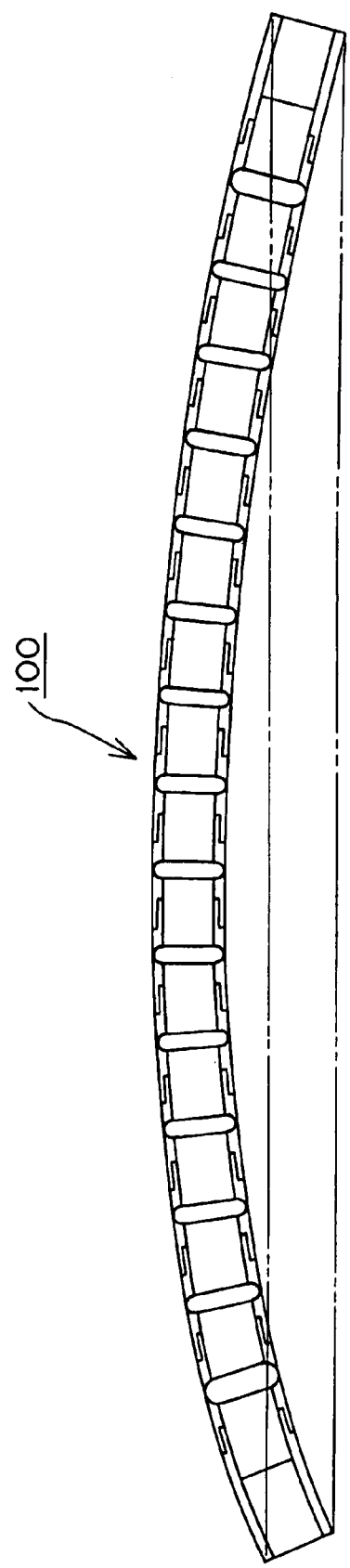
FIG. 9 is a top plan view showing a conventional cable guide in a laterally flexed state.

In the above-described embodiments, the rollers 225, which are disposed either on the inside or on the outside of the bend of the cable guide, have the same shape as that of the upper guide rollers 220. However, as shown in FIG. 6, a circular drum 270 can be mounted on an end of the skate and disposed in contact with the inner circumferential portion of the bend of the cable guide 100. Otherwise, the structure is similar to that of the previously described embodiments, and similar elements are designated by the same reference numbers as used in FIGS. 1a and 1b. As in the case of the embodiments of FIGS. 1a and 1b, the drum contacts the cable guide at the bend both above and below the center of the drum. Thus, the drum, which serves as a guide support, is also in contact with plural, circumferentially spaced, portions of the guide on both sides of an imaginary second plane perpendicular to a first plane in which the longitudinal axis of the guide is disposed, parallel to the longitudinal direction in which the skate moves, and intersecting a center of the turning member about which the plural, circumferentially spaced portions of the guide are centered. As in the case of the embodiments of FIGS. 1a and 1b, the radius of the turning member, in this case the radius of the drum 270, preferably corresponds to the minimum radius of flexion of the guide. The drum 270 is preferably a flanged drum so that the cable guide is prevented from sliding off the drum laterally. With the drum used as a turning member, the cable guide 100 can flex more smoothly than in the case where a plurality of rollers is used.

We claim:

1. A cable guide assembly comprising:
   a flexible cable,
   a cable guide comprising a series of articulably interconnected links, each link comprising pair of side plates bridged by a pair of spaced connectors, the side plates and spaced connectors forming a protective channel through which the cable extends;
   the guide having a radius of flexion limited to a predetermined minimum radius, and having a fixed end and a movable end, and being folded on itself at a bend, whereby a first portion of the guide is in opposed relationship to a second portion of the guide, but the first and second portions are movable longitudinally relative to each other; and
   a skate disposed between the first and second portions of the guide to prevent contact between said portions of the guide;
   in which the skate comprises an elongated frame having first and second sets of rollers, the rollers of the first set being in rolling contact with only one of the opposed first and second portions of the guide and the rollers of the second set being in rolling contact with only the other of the opposed first and second portions of the guide;
   in which the skate also comprises a turning member disposed at an end of the elongated frame and carried with the elongated frame, the turning member having a guide support in contact at least with plural, circumferentially spaced, portions of the guide along a circumferential side of the guide at the bend; and
   in which the first and second portions of the guide are spaced from each other by a distance less than the sum of the diameter of a roller of the first set and the diameter of a roller of the second set, and in which the rollers of the first and second sets are longitudinally offset, and overlap one another in a direction normal to the longitudinal directions of the first and second portions of the guide.

2. A cable guide assembly according to claim 1, in which the guide has a longitudinal axis is disposed substantially in a first plane, in which the skate is movable along a substantially straight longitudinal direction, and in which the guide support is in contact with portions of the guide on both sides of an imaginary second plane perpendicular to the first plane, parallel to said longitudinal direction and intersecting a center of the turning member about which said plural, circumferentially spaced portions of the guide are centered.

3. A cable guide assembly according to claim 1, in which the rollers of the first and second sets are flanged rollers.

4. A cable guide comprising:
   a flexible cable,
   a cable guide comprising a series of articulably interconnected links, each link comprising pair of side plates bridged by a pair of spaced connectors, the side plates and spaced connectors forming a protective channel through which the cable extends;
   the guide having a radius of flexion limited to a predetermined minimum radius, and having a fixed end and a movable end, and being folded on itself at a bend, whereby a first portion of the guide is in opposed relationship to a second portion of the guide, but the first and second portions are movable longitudinally relative to each other; and
   a skate disposed between the first and second portions of the guide to prevent contact between said portions of the guide;
   in which the skate comprises an elongated frame having first and second sets of rollers, the rollers of the first set being in rolling contact with only one of the opposed first and second portions of the guide and the rollers of the second set being in rolling contact with only the other of the opposed first and second portions of the guide;
   in which the skate also comprises a turning member disposed at an end of the elongated frame and carried with the elongated frame, the turning member having a guide support in contact at least with plural, circumferentially spaced, portions of the guide along a circumferential side of the guide at the bend; and
   in which said guide support comprises a plurality of circumferentially spaced rollers in rolling contact with plural, circumferentially spaced portions of the guide along a circumferential side of the guide at the bend.

5. A cable guide assembly according to claim 4, in which the guide has a longitudinal axis is disposed substantially in a first plane, in which the skate is movable along a substantially straight longitudinal direction, and in which the guide support is in contact with portions of the guide on both sides of an imaginary second plane perpendicular to the first plane, parallel to said longitudinal direction and intersecting a center of the turning member about which said plural, circumferentially spaced portions of the guide are centered.

6. A cable guide assembly according to claim 4, in which the rollers of the first and second sets are flanged rollers.

7. A cable guide assembly according to claim 4, in which the first and second portions of the guide are spaced from each other by a distance less than the sum of the diameter of a roller of the first set and the diameter of a roller of the second set, and in which the rollers of the first and second sets are longitudinally offset, and overlap one another in a direction normal to the longitudinal directions of the first and second portions of the guide.

8. A cable guide assembly comprising:
   a flexible cable,
   a cable guide comprising a series of articulably interconnected links, each link comprising pair of side plates bridged by a pair of spaced connectors, the side plates and spaced connectors forming a protective channel through which the cable extends;

the guide having a radius of flexion limited to a predetermined minimum radius, and having a fixed end and a movable end, and being folded on itself at a bend, whereby a first portion of the guide is in opposed relationship to a second portion of the guide, but the first and second portions are movable longitudinally relative to each other; and a skate disposed between the first and second portions of the guide to prevent contact between said portions of the guide;

in which the skate comprises an elongated frame having first and second sets of rollers, the rollers of the first set being in rolling contact with only one of the opposed first and second portions of the guide and the rollers of the second set being in rolling contact with only the other of the opposed first and second portions of the guide;

in which the skate also comprises a turning member disposed at an end of the elongated frame and carried with the elongated frame, the turning member having a guide support in contact at least with plural, circumferentially spaced, portions of the guide along a circumferential side of the guide at the bend; and in which the turning member comprises a circular drum in contact with plural portions of the guide along the inner circumferential side of the guide at the bend.

9. A cable guide assembly according to claim 8, in which the guide has a longitudinal axis is disposed substantially in a first plane, in which the skate is movable along a substantially straight longitudinal direction, and in which the guide support is in contact with portions of the guide on both sides of an imaginary second plane perpendicular to the first plane, parallel to said longitudinal direction and intersecting a center of the turning member about which said plural, circumferentially spaced portions of the guide are centered.

10. A cable guide assembly according to claim 8, in which the rollers of the first and second sets are flanged rollers.

11. A cable guide assembly according to claim 8, in which the first and second portions of the guide are spaced from each other by a distance less than the sum of the diameter of a roller of the first set and the diameter of a roller of the second set, and in which the rollers of the first and second sets are longitudinally offset, and overlap one another in a direction normal to the longitudinal directions of the first and second portions of the guide.

12. A cable guide assembly comprising:
a flexible cable,
a cable guide comprising a series of articulably interconnected links, each link comprising pair of side plates bridged by a pair of spaced connectors, the side plates and spaced connectors forming a protective channel through which the cable extends;

the guide having a radius of flexion limited to a predetermined minimum radius, and having a fixed end and a movable end, and being folded on itself at a bend, whereby a first portion of the guide is in opposed relationship to a second portion of the guide, but the first and second portions are movable longitudinally relative to each other; and a skate disposed between the first and second portions of the guide to prevent contact between said portions of the guide;

in which the skate comprises an elongated frame having first and second sets of rollers, the rollers of the first set being in rolling contact with only one of the opposed first and second portions of the guide and the rollers of the second set being in rolling contact with only the other of the opposed first and second portions of the guide;

in which the skate also comprises a turning member disposed at an end of the elongated frame and carried with the elongated frame, the turning member having a guide support in contact at least with plural, circumferentially spaced, portions of the guide along a circumferential side of the guide at the bend; and in which the turning member comprises a plurality of circumferentially spaced rollers in contact with plural portions of the guide along the outer circumferential side of the guide at the bend.

13. A cable guide assembly according to claim 12, in which the guide has a longitudinal axis is disposed substantially in a first plane, in which the skate is movable along a substantially straight longitudinal direction, and in which the guide support is in contact with portions of the guide on both sides of an imaginary second plane perpendicular to the first plane, parallel to said longitudinal direction and intersecting a center of the turning member about which said plural, circumferentially spaced portions of the guide are centered.

14. A cable guide assembly according to claim 12, in which the rollers of the first and second sets are flanged rollers.

15. A cable guide assembly according to claim 12, in which the first and second portions of the guide are spaced from each other by a distance less than the sum of the diameter of a roller of the first set and the diameter of a roller of the second set, and in which the rollers of the first and second sets are longitudinally offset, and overlap one another in a direction normal to the longitudinal directions of the first and second portions of the guide.

* * * * *